(12) United States Patent
Lucas et al.

(10) Patent No.: US 6,884,269 B2
(45) Date of Patent: Apr. 26, 2005

(54) CONTINUOUS METHOD FOR MANUFACTURE OF UNIFORM SIZE FLAKE OR POWDER

(75) Inventors: Thomas M. Lucas, Pleasant Valley, CT (US); Jody Doyon, Bantam, CT (US)

(73) Assignee: FuelCell Energy, Inc., Danbury, CT (US)

( * ) Notice: Subject to any disclaimer, the term of this patent is extended or adjusted under 35 U.S.C. 154(b) by 323 days.

(21) Appl. No.: 10/171,148

(22) Filed: Jun. 13, 2002

(65) Prior Publication Data

US 2003/0232000 A1 Dec. 18, 2003

(51) Int. Cl.$^7$ ................................................. B01D 9/00
(52) U.S. Cl. ...................... 23/308 R; 23/302 R; 23/304
(58) Field of Search ............................ 23/308 R, 302 R, 23/304

(56) References Cited

U.S. PATENT DOCUMENTS

| | | |
|---|---|---|
| 3,120,456 A | 2/1964 | Broers |
| 3,351,491 A | 11/1967 | Harris et al. |
| 4,009,321 A | 2/1977 | Baker et al. |
| 4,079,171 A | 3/1978 | Marianowski et al. |
| 4,216,278 A | 8/1980 | Arendt et al. |
| 4,591,538 A | 5/1986 | Kunz |
| 5,468,573 A | 11/1995 | Bregoli et al. |

FOREIGN PATENT DOCUMENTS

| | | |
|---|---|---|
| EP | 0 689 258 A1 | 6/1995 |
| JP | 7-296833 | 4/1994 |
| JP | 09027332 | 1/1997 |
| JP | 07226513 | 3/1997 |

*Primary Examiner*—Stanley S. Silverman
*Assistant Examiner*—Edward M. Johnson
(74) *Attorney, Agent, or Firm*—Robin, Blecker & Daley (57) ABSTRACT

A method and apparatus for continuous fabrication of homogeneous thin flake or powder electrolyte material from inorganic salt, metallic or similar materials or from mixtures of such materials for use in Carbonate Fuel Cell ("CFC") power plants. Electrolyte precursor powders are fed to a continuous blender type mixer using precision metering equipment that controls material feed rates. The homogenous mixture of blended powders is then fed into a high temperature melting tank in which the mixture is melted, forming the desired molten eutectic composition. The liquid eutectic melt drips from the melting tank through ceramic or metallic nozzles and splat-cools on a rotating, water-cooled metal cylinder to produce uniform size, thin flake material. The thin flake electrolyte material can be used as-is, or it may be further processed using continuous grinding and powder fabrication equipment.

28 Claims, 6 Drawing Sheets

CONTINUOUS METHOD FOR MANUFACTURE OF UNIFORM SIZE FLAKE OR POWDER

BACKGROUND OF THE INVENTION

1. Field of the Invention

This invention relates to the manufacture of thin homogeneous flake or powder material from inorganic salt, metallic or similar materials or mixtures of these materials, and more particularly to a manufacturing method and equipment for the continuous production of electrolyte material used in Carbonate Fuel Cell ("CFC") power plants.

2. Description of the Related Art

A fuel cell is a device that directly converts chemical energy stored in a fuel such as hydrogen or methane into electrical energy by means of an electrochemical reaction. In general, a fuel cell includes a negative or anode electrode and a positive or cathode electrode separated by an electrolyte matrix, which serves to conduct electrically charged ions between the oppositely charged electrodes. In order to produce a useful power level, a number of individual fuel cells are stacked in series with an electrically conductive layer in between each cell.

The electrolyte matrix of a fuel-cell is usually in the form of an electrolyte-impregnated matrix structure. Methods for fabricating such structures are described in, for example, U.S. Pat. Nos. 3,120,456; 3,351,491; 4,009,321; 4,079,171; 4,216,278; 4,591,538; and 5,468,573; Japanese Patent Nos. JP726833, JP09027332, and JP07226513; and European Patent No. EP0689258A1.

In current CFC technology, the electrolyte matrix includes a porous ceramic support impregnated with a molten eutectic electrolyte. Impregnation of the ceramic matrix with electrolyte typically occurs in-situ during first time heat-up and conditioning of the fuel cell stack. The active electrolyte presently used is a melted eutectic mixture of one or more of the inorganic salts lithium carbonate ($Li_2CO_3$), potassium carbonate ($K_2CO_3$), and sodium carbonate ($Na_2CO_3$). Secondary electrolyte additives such as the carbonates of alkaline earth elements magnesium, calcium, barium and strontium, such as, for example, magnesium carbonate ($MgCO_3$) or calcium carbonate ($CaCO_3$), or the oxides of such alkaline earth elements, such as magnesium oxide (MgO), or combinations thereof, may also be added if desired to reduce the cathode dissolution in the liquid electrolyte.

In the present state of the art, a fuel cell stack may include several hundred cells which are stacked in series, each separated by an electrolyte-filled matrix component. CFC demonstration units of several hundred kilowatts in size are currently in operation, and commercial unit market entry is planned for shortly. Electrolyte material production processes therefore must be established to meet the required demands of this commercialization effort. Electrolyte must also be fabricated at a cost that enables the CFC to be commercially competitive within the electric power generation markets.

This presents several significant challenges in light of the electrolyte requirements. In order for the CFC to work properly, the carbonate electrolyte used must be of a precise, uniform composition to form a low melting point eutectic mix. Stringent requirements on the physical characteristics of the electrolyte powder (e.g., particle size, morphology, and angle of repose) are also imposed which must be carefully controlled to enable precise loading into the CFC electrodes and cell hardware using existing continuous production methods and equipment.

Methods currently employed for manufacturing CFC electrolyte typically include weighing a precise amount of electrolyte precursor powders followed by mixing in a batch process using a P-K type blender, ball mill or other similar device. The homogeneous powder mix is transferred to one or more high-temperature crucibles and heated to above the melting point of the mixture of electrolyte precursor powders to form a molten eutectic mix. The molten mix is frozen in the crucible as a slug or is frozen into large, non-uniform chips by dumping the molten liquid into metal pans and allowing it to cool, a process known as "splat-cooling." While the chips formed by the latter method are more desirable, splat-cooling presents considerable hazard and risk to equipment operators by exposing them to molten liquid splatter. Regardless of method used, the solidified electrolyte slug or chips must then be broken into smaller pieces and finally transferred to a pulverizing device such as a hammer mill to form the desired uniform size flake or powder final material. Such sequential batch processing method is labor intensive, expensive, and not easily scalable to meet anticipated commercial production demands.

SUMMARY OF THE INVENTION

The present invention is drawn to an innovative method that addresses the above described shortcomings of existing processes for forming uniform size flake or powder materials from inorganic salts, metallic or similar materials or mixtures of such materials. Specifically, a method is herein described for the continuous production of a mixture of carbonate salts (such as $Li_2CO_3$, $K_2CO_3$, and/or $Na_2CO_3$) that are commonly used as CFC electrolyte materials.

It is an objective of the invention to overcome the limitations of the prior art described above by presenting an innovative continuous manufacturing method to produce flake or powder material from inorganic salt and metal materials or mixtures of such materials with precise control of the physical characteristics of the flake or powder (e.g., particle size, morphology, angle of repose).

It is a further objective of the invention to provide a system that is cost effective with minimal labor requirements.

It is yet a further objective of the invention to provide an electrolyte manufacturing method that can continuously produce commercial quantities of electrolyte material having a precise molar composition, specifically, within the range of ±1% molar ratio.

In accordance with the principles of the present invention, the above and other objectives are realized in an automated method for manufacturing CFC electrolyte thin flake or powder materials. More particularly, the method of the invention includes feeding measured amounts of precursor powders into a continuous blender, blending the precursor powders until a homogeneous dry powder mixture is obtained, continuously adding the homogeneous dry powder mixture to a high-temperature melting tank, heating the powder mixture in the melting tank so that it melts, forming a eutectic melt, cooling the eutectic melt by dripping the melt from the melting tank onto a rotating water-cooled cylinder, and removing the cooled uniform size flakes of material from the rotating cylinder. In a further aspect of the invention, getter materials are incorporated into the liquid melt zone in the melting tank to remove fuel-cell contaminants.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
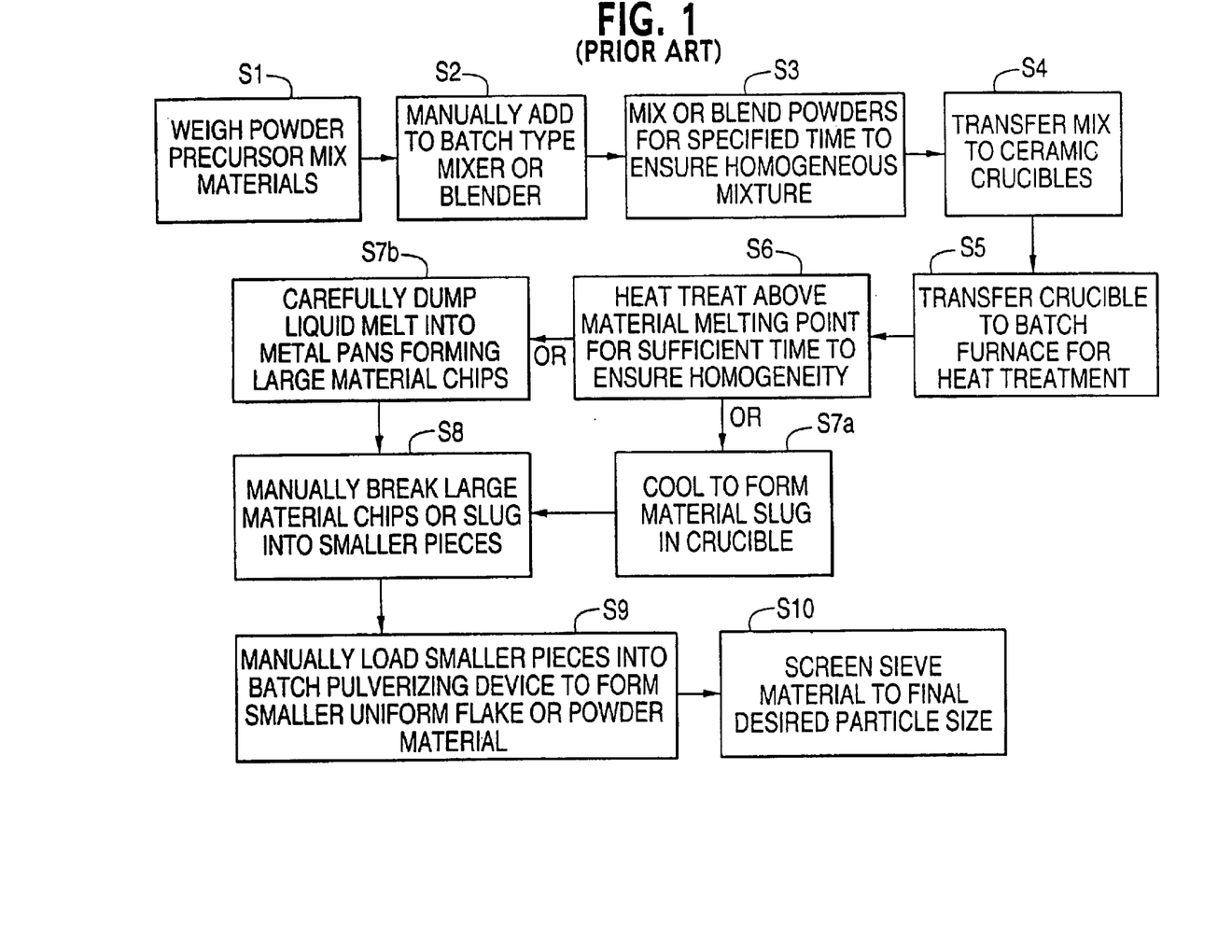
FIG. 1 is a process flow diagram of a conventional method for forming thin flake or powder electrolyte materials.

FIG. 1 shows the process flow of a conventional method used for forming flake or dry powder fuel-cell electrolyte materials. In a first step S1, precise amounts of precursor powder materials are weighed. The precursor powders are manually added to a batch-type mixer or blender, such as a P-K type blender, ball mill or similar device in step S2, and in step S3 the powders are blended for a minimum specified time of between approximately 5 to 20 minutes to obtain a homogeneous powder mixture. In step S4, the homogeneous powder mixture is transferred to one or more high-temperature crucibles. The crucibles are transferred to a furnace in step S5, where the powder mixture is heated to above the melting point of the mixture of precursor powders. As shown in step S6, heat treatment occurs for a period of time of between approximately 30 to 120 minutes sufficient to ensure homogeneity of the molten mixture.

Once a homogeneous molten eutectic mixture is obtained, the molten liquid may either be cooled in the crucible to form a solid slug, as in step S7a, or "splat-cooled" by dumping the liquid onto cooled metal pans, as in step S7b. The solidified slug or non-uniform size chips are then manually broken into smaller pieces in step S8. Finally, in step S9, these smaller pieces are loaded into a batch pulverizer to form smaller uniform flake or powder material. Final screen sieving may be required in step S10 to achieve the desired uniform particle size.

Figure 2:
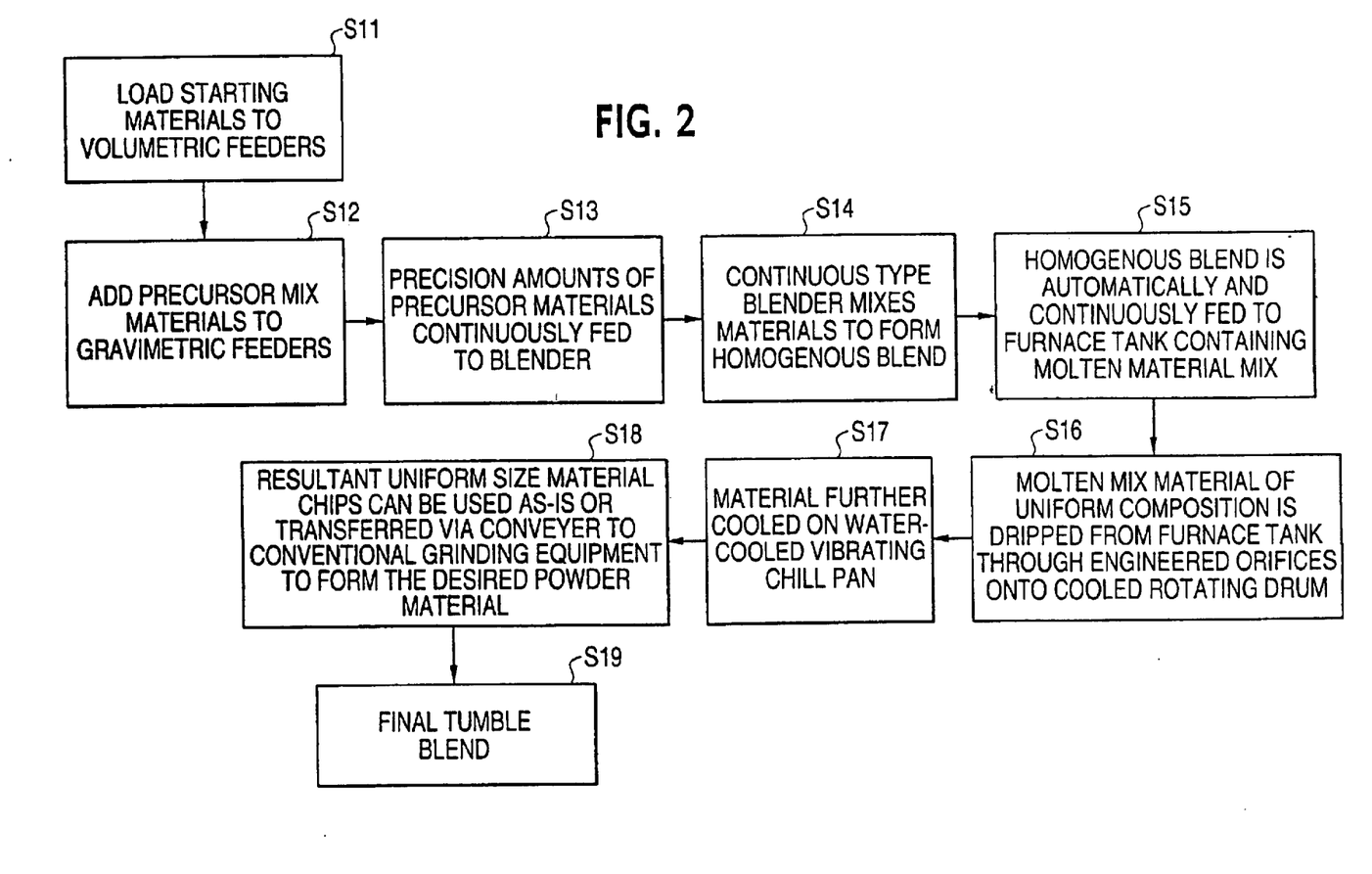
FIG. 2 is a process flow diagram of a method for forming thin flake or powder electrolyte materials in accordance with the principles of the present invention.

As previously discussed, the conventional method of FIG. 1 has a number of disadvantages including being labor intensive, expensive, and not easily scalable to meet desired commercial needs. These disadvantages are overcome by the method of the present invention whose process flow is shown in FIG. 2. In the method or process in accord with the invention, in a first step S11, precursor powder materials, preferably comprising at least one inorganic carbonate salt and possibly at least one metallic salt and, more preferably, one of the inorganic salts lithium carbonate ($Li_2CO_3$), potassium carbonate ($K_2CO_3$) and sodium carbonate ($Na_2CO_3$), and secondary electrolyte additives, such as, for example, at least one of the carbonate or oxide components of the alkaline earth elements magnesium, calcium, barium and strontium, are loaded into volumetric feeders. These precursor materials are fed into gravimetric feeders in step S12 by means of the fast refill volumetric feeders used in step S11. Precision feed rate metering of the powder materials as the materials are fed to a blender is accomplished gravimetrically in step S13 by controlling the level of material in the feeders with the fast refill volumetric feeders. This allows feed rate accuracies of ±1% or less.

In step S13, all material from the feed system is gravity fed into a continuous ribbon type blender. Once full with a precise powder compositional mix, at step S14 the powder is blended continuously as it travels through a defined blending zone, resulting in a homogenous dry powder mix of accurate composition.

Next, at step S15, the homogeneous powder mix is added to a high temperature melting tank or furnace and melted to form the eutectic electrolyte melt. A temperature of between approximately 500° C. and 800° C. is maintained in the melting tank to ensure complete melting of the molten salt mixture. The electrolyte resonance time in the melting tank is between approximately 30 and 90 minutes.

Dry powder mix is continuously added to the melting furnace using a screw auger type feeder where the blended powder material is allowed to continuously free fall into the molten pool of eutectic electrolyte in the tank. The molten mixture is then allowed to drip from the melting tank through engineered orifices and onto a rotating, water-cooled metal cylinder in step S16. By this process, known as "splat-cooling," uniform size, thin flake electrolyte material is produced.

In step S17, further cooling of the material may be accomplished by conveying the material on a water-cooled vibrating chill pan and by convection cooling on a belt conveyor, as described further below with respect to FIGS. 3 and 5. In step S18, the resultant uniform size chips may be used as is, or may be transferred by conveyor for further processing by continuous grinding equipment to form electrolyte powder material with uniform particle size required for final use. Finally, in step S19, optimal electrolyte material flow characteristics, homogeneity, and further cooling are accomplished by a final tumble blend.

By the continuous flow operation shown in FIG. 2, uniform size thin flake or powder electrolyte material can be produced in quantities to meet desired commercial demand. Specifically, where the electrolyte is a carbonate electrolyte, it can be can be impregnated into a porous ceramic matrix for use in a carbonate fuel cell.

Figure 3:
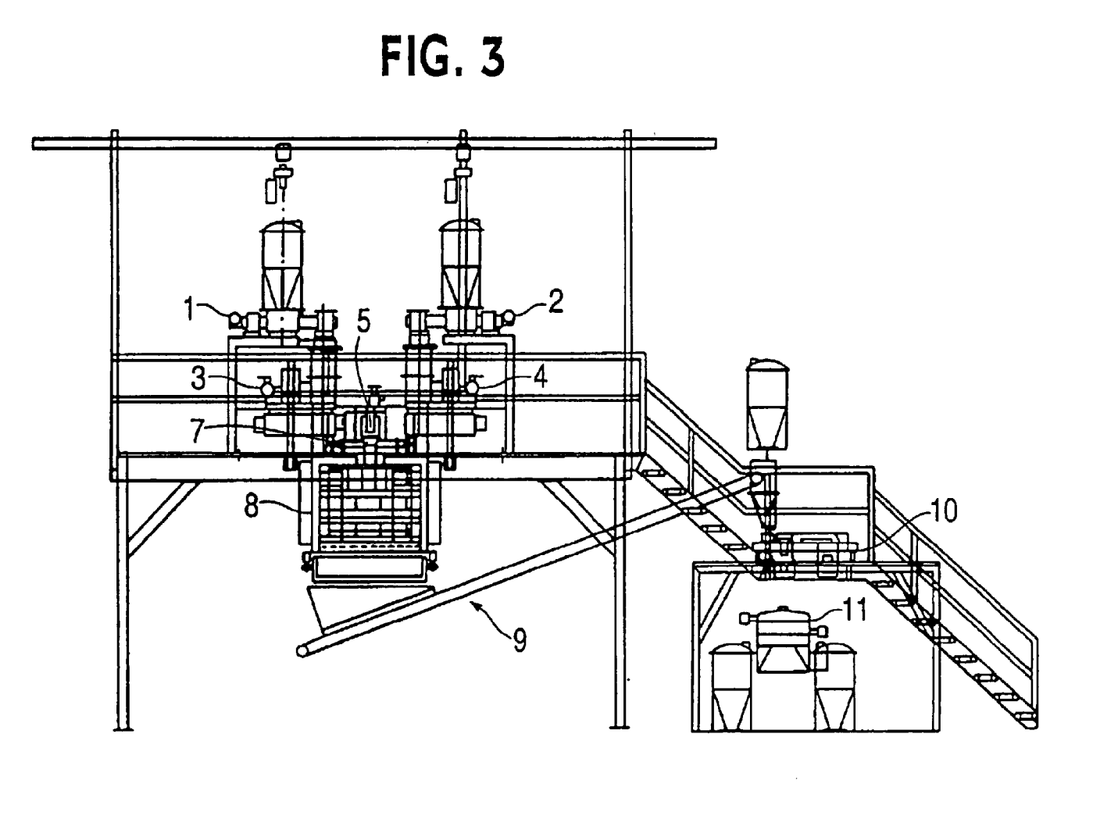
FIG. 3 is an elevational view of a system used to carry out the method of the invention depicted by the process flow diagram of FIG. 2.

FIG. 3 is an elevational view showing a system for carrying out the method or process of the invention. More particularly, in FIG. 3, precision material feeders, a continuous blender, a drip melting tank, and a liquid splat-cooling system have been integrated to carry out the method of FIG. 2 to produce uniform-size thin flake or powder electrolyte material. As shown in FIG. 3, measured amounts of commodity electrolyte precursor powder materials are fed into gravimetric feeders 3 and 4 by fast refill volumetric feeders 1 and 2. Next, precise amounts of powder material are gravimetrically fed into a continuous ribbon-type blender 5.

Figure 4:
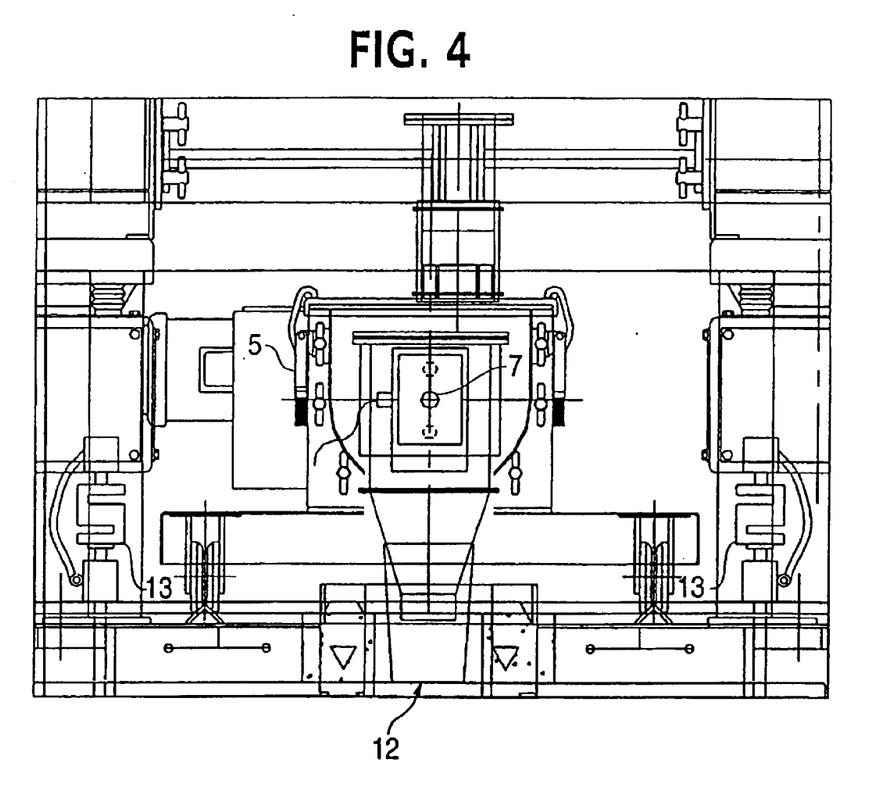
FIG. 4 is a cross-sectional view of the blending unit used in the system of FIG. 3.

A more detailed view of the continuous blender 5 is shown in FIG. 4. Once the blender 5 is full of precursor powder materials, the mixture is blended continuously, resulting in a homogeneous dry powder mixture of precise composition. The homogeneous mixture is fed through a screw auger type feeder 7 and allowed to free fall through an air-cooled inlet sleeve 12 into a high temperature melting tank 8 (not shown in FIG. 4). At least two load cells 13, which support the melting tank 8 (shown in FIG. 5), are positioned on both sides of the apparatus at approximately the level of the blender 5, as shown in FIG. 4.

Figure 5:
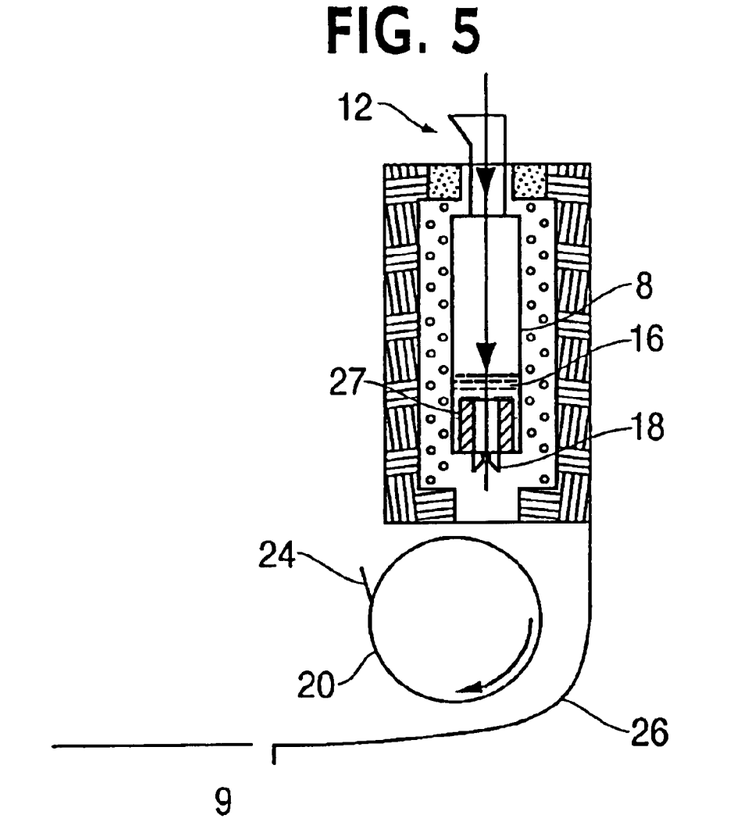
FIG. 5 is a cross-sectional view of the melting tank used in the system of FIG. 3.

A cross-sectional view of the melting tank 8 and related apparatus is shown in FIG. 5. As the powder material falls from feeder 7 (FIG. 4), it enters melting tank 8 through an air-cooled inlet sleeve 12. Load cells 13, which support the melting tank 8, as described above and shown in FIG. 4, continuously monitor tank weight and control powder feed rate to maintain the required head pressure in the tank and protect the tank from over-filling. The homogeneous powder mixture is heated in the tank and melts to form a eutectic electrolyte melt.

Cost effective, lower grade commodity electrolyte precursor materials may contain secondary contaminant materials which can be destructive to fuel cells. Such contaminants must be removed to enable use in the carbonate fuel cell. Thus, getter materials 27 such as high surface area nickel or iron foam can be incorporated in the liquid melt zone 16 to absorb and remove intolerable fuel cell contaminants such as, for example, sulfur and chlorine. The contaminants removed using such getter materials 27 are heavier than the electrolyte melt and sink in the tank, eventually settling on the bottom. Removal of contaminants at this step may enable the use of lower grade commercially available commodity precursor materials that can provide for significant product cost savings.

Next, the liquid eutectic melt passes through ceramic or metallic nozzles 18 of specified size and onto a rotating, water-cooled metal cylinder 20 to produce uniform size, thin flake material. The number of nozzles used corresponds to the desired production capacity.

Figure 6A:
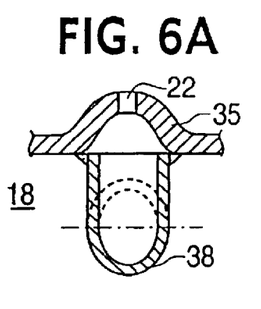
FIGS. 6a and 6b are detailed views of drip nozzles used in the melting tank of FIG. 5.
Figure 6B:
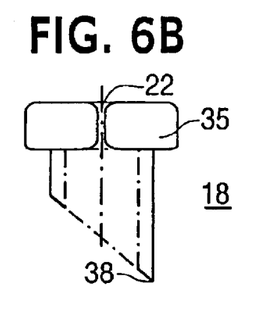
Figure 7:
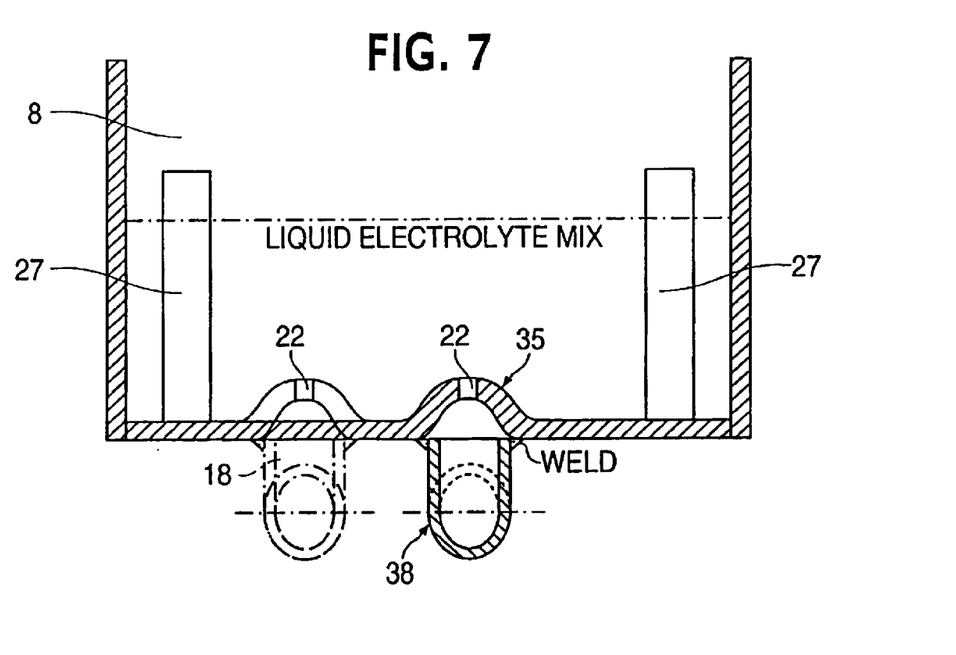
FIG. 7 is a detailed view of the melting tank of FIG. 5 using the drip nozzles of FIGS. 6a and 6b.

The drip nozzles 18, shown in detail in FIGS. 6a, 6b and 7, are preferably welded to the bottom of the melting tank 8 and are formed from metal or ceramic material. In either case, the nozzles 18 are designed with orifices 22 formed in dimples 35 situated above the bottom of the melting tank 8, which facilitates separation of the heavy contaminants settled on the bottom of the tank from the liquid melt. While contaminants sink below raised orifices 22, "clean" liquid electrolyte enters the raised orifices 22 and flows through nozzles 18. Both metallic and ceramic drip nozzles 18 shown in FIGS. 6a and 6b provide a path for liquid eutectic melt that enters orifice 22 and flows down the length of the nozzle 18 toward a nozzle tip 38 opposite the orifice 22. Nozzle tip 38 is preferably formed with an angled orifice such that liquid eutectic flowing down the inside walls of the nozzle accumulates at the lowest point of the tip 38, from which it drips.

Molten carbonate electrolyte free-falls from the tips 38 of nozzles 18 from melting tank 8 and drips onto rotating water-cooled cylinder 20 to produce thin flake material. The splat-cooled material is scraped off the cylinder 20 by scraper 24 and may be used as is, or may be further cooled on a vibrating water-cooled pan 26. Additional cooling of the material may be accomplished by convection cooling as the material is transported on belt conveyor 9 to powder grinding equipment 10, shown in FIG. 3.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. More particularly, while the method of the invention has been described as producing a thin flake electrolyte material, the method can also be used to produce any thin flaked crystallite, metallic, glass or similar material

What is claimed is:

1. An automated method for continuously producing homogeneous uniform-size thin flake or powder material comprising the steps of:
   feeding measured amounts of precursor powders into a continuous blender;
   blending said precursor powders until a homogeneous dry powder mixture is obtained;
   continuously adding said homogeneous dry powder mixture to a high-temperature melting tank;
   heating said powder mixture in said melting tank so that it melts, forming a eutectic melt;
   cooling said eutectic melt by dripping said melt from said melting tank onto a rotating water-cooled cylinder; and
   removing the cooled uniform size flakes of material from said rotating cylinder.

2. The method of claim 1, wherein said precursor powders are selected from the group of metallic salts.

3. The method of claim 1, wherein said precursor powders comprise a mixture of at least one inorganic carbonate salt and at least one metallic salt.

4. The method of claim 1 wherein said precursor powders are selected from the group of inorganic carbonate salts.

5. The method of claim 4, wherein the precursor powders comprise at least one of lithium carbonate, potassium carbonate, and sodium carbonate.

6. The method of claim 5, wherein the precursor powders further include secondary electrolyte additives comprising at least one of magnesium carbonate, calcium carbonate, barium carbonate and strontium carbonate.

7. The method of claim 6, wherein the secondary electrolyte additives further include at least one of the oxides of magnesium, calcium, barium and strontium.

8. The method of claim 5, wherein said eutectic melt formed in said melting tank is an electrolyte such that said cooled thin flake electrolyte material is ionically conductive.

9. The method of claim 1, wherein the step of feeding measured amounts of precursor powders into a continuous blender is accomplished using at least one gravimetric feeder.

10. The method of claim 9, wherein the level of precursor powder material in said at least one gravimetric feeder is controlled using at least one fast refill volumetric feeder.

11. The method of claim 9, wherein the step of continuously adding said homogeneous dry powder mixture to said high-temperature melting tank is accomplished using a screw auger-type feeder.

12. The method of claim 1, wherein heating said powder mixture in said melting tank to form said eutectic melt occurs at a temperature in the range of between approximately 500° C. and 800° C. for a period of time in the range of between approximately 30 and 90 minutes.

13. The method of claim 12 wherein, during said step of cooling said eutectic melt by dripping said melt from said melting tank onto a rotating water-cooled cylinder, said liquid eutectic melt flows through nozzles in said melting tank and drips out of said nozzles onto said cylinder.

14. The method of claim 13, wherein said liquid eutectic melt flows from said melting tank into orifices at a first end of said nozzles.

15. The method of claim 1, wherein the step of removing the cooled uniform size flakes of material from said rotating cylinder is accomplished using a scraper.

16. The method of claim 15, wherein the thin flake material scraped from said cooled rotating cylinder is further cooled on a water-cooled vibrating pan.

17. The method of claim 16, further comprising the step of processing said cooled thin flake material using grinding and screening equipment to obtain homogeneous powder of desired particle size.

18. The method of claim 17, further comprising a final step of tumble blending.

19. The method of claim 18, wherein said homogeneous powder is an electrolyte material having a molar composition within the range of ±1% molar ratio.

20. An automated method for continuously producing commercial quantities of electrolyte material for use in molten carbonate fuel cells, comprising the steps of:

feeding measured amounts of precursor powders into a continuous blender, said precursor powders comprising at least one of lithium carbonate, potassium carbonate and sodium carbonate;

blending said precursor powders until a homogeneous dry powder mixture is obtained;

continuously adding said homogeneous dry powder mixture to a high-temperature melting tank;

heating said powder mixture in said melting tank so that it melts, forming a eutectic electrolyte melt;

cooling said eutectic electrolyte melt by dripping said melt from said melting tank onto a rotating water-cooled cylinder; and removing the cooled uniform size flakes of electrolyte material from said rotating cylinder.

21. The method of claim 20, wherein said precursor powders further include secondary additives comprising at least one of magnesium carbonate, calcium carbonate, barium carbonate and strontium carbonate.

22. The method of claim 21, wherein the secondary additives further include at least one of the oxides of magnesium, calcium, barium and strontium.

23. The method of claim 20, further including the step of impregnating a porous ceramic matrix in a carbonate fuel cell with said thin flake electrolyte material.

24. The method of claim 20, further including the step of processing said cooled uniform size flakes of electrolyte material using grinding and screening equipment to obtain a homogeneous electrolyte powder of desired particle size.

25. The method of claim 24, further including the step of impregnating a porous ceramic matrix in a carbonate fuel cell with said homogeneous electrolyte powder.

26. An automated method for manufacturing electrolyte material for use in molten carbonate fuel cells that continuously removes intolerable fuel cell contaminants, comprising the steps of:

feeding measured amounts of precursor powders into a continuous blender, said precursor powders comprising at least one of lithium carbonate, potassium carbonate and sodium carbonate;

blending said precursor powders until a homogeneous dry powder mixture is obtained;

continuously adding said homogeneous dry powder mixture to a high-temperature melting tank;

heating said powder mixture in said melting tank so that it melts, forming a eutectic electrolyte melt;

incorporating getter materials in a liquid melt zone in said melting tank;

cooling said eutectic electrolyte melt by dripping said melt from said melting tank onto a rotating water-cooled cylinder; and removing the cooled uniform size flakes of electrolyte material from said rotating cylinder.

27. The method of claim 26, wherein said fuel cell contaminants include sulfur or halogens and said getter materials comprise high surface area nickel or iron foam.

28. The method of claim 27, wherein said cooled uniform size flakes of electrolyte material are further processed using grinding and screening equipment to obtain a homogeneous electrolyte powder of desired particle size, and wherein said homogeneous electrolyte powder is impregnated into a porous ceramic matrix of said molten carbonate fuel cell.

* * * * *